Sept. 18, 1934.  A. E. W. JOHNSON ET AL  1,973,985
ROD WEEDER BEARING
Filed July 13, 1933
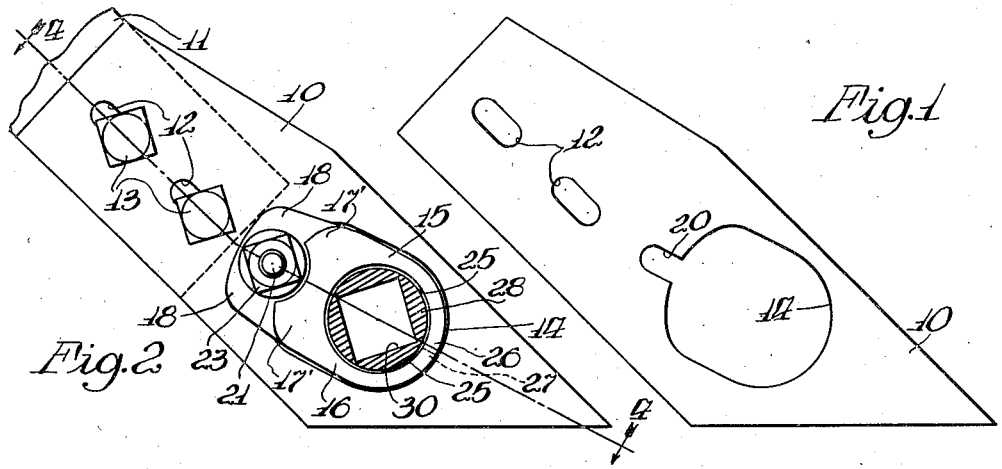
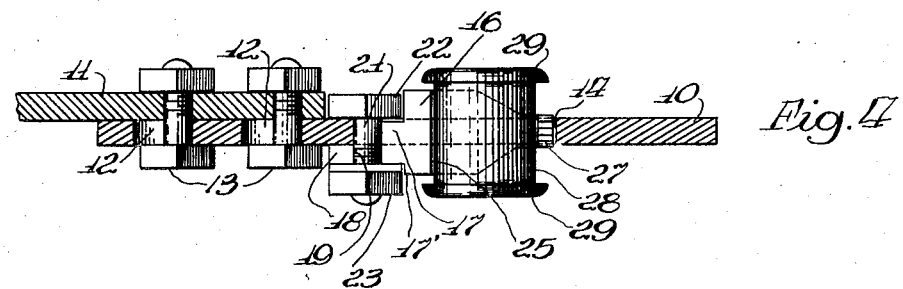
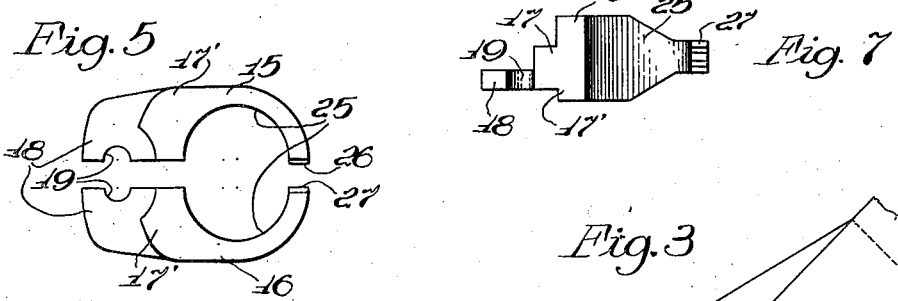
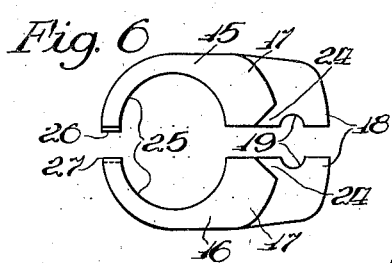
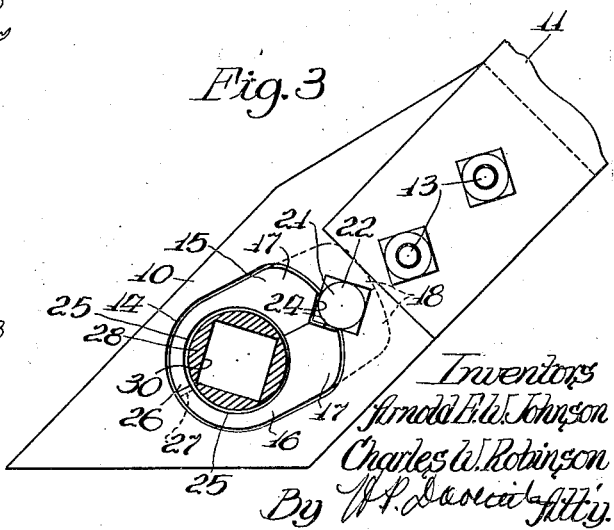

UNITED STATES PATENT OFFICE 1,973,985

ROD WEEDER BEARING

Arnold E. W. Johnson, Chicago, Ill., and Charles W. Robinson, Hamilton, Ontario, Canada, assignors to International Harvester Company, a corporation of New Jersey Application July 13, 1933, Serial No. 680,164

10 Claims. (Cl. 97—42)

The present invention relates to rod weeder bearings.

In the class of agricultural implements in which subsoil rotary rods are utilized, the provision of bearings which must necessarily operate under the soil is one of the major problems. The rods, which are usually angular in cross section, are forced broadside through the soil as they are rotated by power driven means. As the rods travel through the subsoil, they uproot weeds and other plant growth and cultivate the soil by loosening and turning over the material. The angular rod, usually square in cross section, is supported from the main frame of the implement by a number of beams or shanks, goose-neck in shape, at laterally spaced intervals. Each shank is provided with a bearing shoe in which the journal bearing for the rotary rod is mounted.

In the operation of rod weeders, the bearings for the rotary rod, as they travel through the subsoil, become clogged with dirt and, as a result, great friction is created in the bearings. The journal members are subjected to wear and, if the binding becomes sufficient, breakage is apt to occur in some of the drive connections.

To overcome the difficulties resulting from unusual conditions of operation found in rod weeders, specially designed shoe members and bearing journals have been developed. The present invention is an improvement in a construction of this nature, means being provided in the shoe construction and bearing and journal members to reduce resistance to a minimum and to provide for the escape of dirt from the bearing. The provision is also made for replacement of the wearing parts to facilitate repairing and replacement.

In the accompanying drawing:

Figure 1 is a side elevation of a shoe member, as incorporated in the construction of the invention;

Figure 2 is a side elevation showing a portion of a rod weeder shank with the shoe member secured thereto and with the journal and bearing members in position, the journal member being cut away in section to show the bearing members;

Figure 3 shows the same parts as Figure 2 from the reverse side;

Figure 4 is a section taken on the line 4—4 of Figure 2;

Figures 5 and 6 show the bearing portions or sections removed from their operative position and spaced apart, the figures showing respectively the two sides of said members; and, Figure 7 is a plan view of one of the bearing members taken from a horizontal plane between the two members.

As shown in Figure 1, the shoe member 10, as used in the illustrated construction, is formed from a thin flat piece of sheet steel, being sheared to shape and punched with the desired openings. Said member is pointed at its forward ends to provide a ground engaging point which is conventional in rod weeder construction. The upper portion forms attaching means for securing to a shank 11, as illustrated in Figure 2. Openings 12, elongated to allow for irregularities in manufacturing, provide means for attaching the shoe member to the shank 11 by means of a pair of bolts 13.

A large opening 14 formed in the shoe member is somewhat oval in shape, slightly tilted downwardly toward the front. Said opening is formed in the shoe for receiving an upper bearing section 15 and a lower bearing section 16. Said bearing sections are provided with lateral shoulder portions 17 at one side, which fit into the opening 14 abutting the shoe member at the rear side of said opening and the relatively narrow shoulder portions 17' at the other side. Said shoulder portions are tapered inwardly at the front, the forward portions of the bearing members being of a width substantially the same as the thickness of the shoe member 10.

At one side of a vertical plane extending through the center of the bearing members, as best illustrated in Figure 6, said members are provided with rearwardly extending lugs 18, which lie alongside the shoe member when the lugs are in position. Said lugs are provided with semi-cylindrical notches 19 which mate with each other to form a transverse circular opening when the members are in position on the shoe member. A slot 20 cut rearwardly into the shoe member from the main opening 14 is in alignment with the opening formed by the notches 19 in the lugs. A bolt 21 provided with a square head 22 extends through the slot 20 and through the opening formed by the notches 19. A nut 23 threaded on said bolt, as shown in Figure 2, clamps the lugs in position against the shoe member. The head 22 of the bolt, being square in cross section, is locked against rotation by seating in notches 24 formed on the shoulder portions 17 of the bearing members 15 and 16. The nut 23 seats directly on the lugs 18, arcuate portions being cut away from the shoulders 17' to provide for rotation of the nut. By this means, the bearing members or sections are securely clamped in position against the shoe member.

As best shown in Figure 4, the bearing sections are substantially centered with respect to the shoe member 10. Each bearing section is formed with a bearing surface 25, said surfaces cooperating to form a bearing surface circular in cross section, narrow at the front and wide at the back. To prevent relative lateral displacement of the forward ends of the bearing members, the upper member 17 is provided centrally at its forward end with a lug 26 and the lower member 16 is provided at the same location with a mating recess 27 into which said lug fits.

A journal member 28 having a cylindrical bearing surface and radially extending flanges 29 at each end thereof, is fitted between the bearing members in engagement with the bearing surfaces formed thereon.

The operation of the construction, as above described, will be apparent to those familiar with this art. A rod weeder of the square cross section type extends through the opening 30 formed in the journal member 29 and is driven by any suitable drive mechanism. As the shoe is drawn through the soil with the rod beneath the ground level thereof, the journal member is rotated in the bearing members. The shoe 10, being comparatively thin in its transverse dimension, penetrates the soil very easily. The rotating journal member engages the soil, pushing it upwardly or downwardly, depending upon the direction of rotation. A certain amount of dirt is carried between the bearing surfaces. However, as the bearing surfaces are completely in contact only at the back of the journal member, the dirt which is carried therebetween is carried on around and out at the forward side. It has been found that in a construction of this type dirt does not accumulate in such a manner as to cause binding of the journal members. Moreover, as the dirt carried into the bearing is carried around and out at the other side, journal members of this construction have been found to give long wear compared to other types now in use.

It is to be understood that applicants have shown and described only one embodiment of their improved bearing construction for rod weeder shoes and that they claim as their invention all modifications falling within the scope of the appended claims.

What is claimed is:

1. A rod weeder shoe comprising, in combination with a shank of a rod weeder, a shoe member secured to said shank and formed with a transverse opening, complementary bearing sections fitted in said opening and forming a bearing surface for a journal member, rearwardly extending securing lugs carried by the bearing halves, and means for securing said lugs to the shoe member.

2. A rod weeder shoe comprising, in combination with a shank of a rod weeder, a flat shoe member lying in a vertical plane parallel to the line of draft of the rod weeder and secured to the shank, said member being formed with a transverse opening, complementary bearing sections fitted in said opening, said sections being formed to provide a bearing surface for a weeder rod journal member and with integral securing lugs extending therefrom, and means for securing said lugs to the shoe member.

3. A rod weeder shoe comprising a comparatively thin shoe member lying in a vertical plane parallel to the line of draft of the weeder carrying the shoe, said member being formed with an opening therein, complementary bearing halves fitted in said opening, said halves being formed with bearing surfaces and with integral lugs extending parallel to the shoe member, and means for securing said lugs to the shoe member.

4. A rod weeder shoe comprising, in combination with a shank of a rod weeder, a thin flat shoe member lying in a vertical plane parallel to the line of draft of the rod weeder and secured to the shank, said member being formed with a transverse opening, complementary bearing sections fitted in said opening and formed to provide a bearing surface, a journal member mounted in contact with said bearing surface and held against axial movement with respect thereto, said bearing halves being formed to provide a narrow bearing surface at the forward ends of substantially the same width as the shoe member and to provide a wide bearing surface at the rear of the journal member, and means for securing said sections in position with respect to the shoe member.

5. A rod weeder shoe comprising a thin flat shoe member formed with an opening therein, complementary bearing sections fitted in said opening and formed to provide a bearing surface, a journal member mounted in contact with said bearing surface, securing lugs extending rearwardly from the bearing sections, mating notches formed in said lugs, and a single element extending through the opening formed by the notches and through the shoe member for securing the bearing sections in position relative to the shoe member.

6. A rod weeder shoe comprising, in combination with a shank of a rod weeder, a thin shoe member lying in a vertical plane parallel to the line of draft of the weeder and secured to the shank, said shoe member being formed with a transverse opening, complementary bearing sections fitted in said opening and formed to provide a bearing surface, a journal member mounted in contact with said bearing surface for rotation on an axis perpendicular to the plane of the shoe member, said bearing sections being divided along a horizontal plane perpendicular to the shoe member, means at the ends of said bearing sections to hold said members against relative lateral displacement with respect to each other, and means at the rear of said bearing sections for holding the sections against movement relative to the shoe member.

7. A rod weeder shoe comprising a comparatively thin shoe member formed with an opening therethrough, complementary bearing sections fitted in said opening, said sections being formed to provide a narrow bearing surface at one side and a wide bearing surface at the other side, a journal member mounted in contact with said bearing surfaces, and means for holding the bearing sections in position relative to the shoe member.

8. A rod weeder shoe comprising a comparatively thin shoe member formed with an opening therethrough, complementary bearing sections fitted in said opening, said sections being formed to provide a narrow bearing surface at one side and a wide bearing surface at the other side, a journal member mounted in contact with said bearing surfaces, lugs extending from the bearing sections alongside and in contact with the shoe member, and means for securing said lugs to the shoe member.

9. A rod weeder shoe comprising a comparatively thin shoe member formed with an opening therethrough, complementary bearing sections fitted in said opening, said sections being formed to provide a narrow bearing surface at one side and a wide bearing surface at the other side, a journal member mounted in contact with said bearing surfaces, lugs extending from the bearing sections alongside and in contact with the shoe member, mating notches formed in said lugs, the shoe member being formed with an opening in registration with the opening formed by said notches, and a headed securing element extending through the registering openings for clamping the bearing sections in position relative to the shoe member.

10. A rod weeder bearing comprising, in combination with a shank of a rod weeder, a thin flat shoe lying in a vertical plane parallel to the line of travel and secured to the shank, an opening formed in said shoe, complementary bearing halves mounted in said opening, said bearing halves being of a width substantially the same as the shoe at their forward ends and being widened at their rear ends to form a bearing surface for a weeder rod journal, lugs extending rearwardly from said bearing halves, and means for securing said lugs to the shoe.

ARNOLD E. W. JOHNSON.
CHARLES W. ROBINSON.